US007950489B2

(12) United States Patent
Kazanchy

(10) Patent No.: US 7,950,489 B2
(45) **Date of Patent: *May 31, 2011**

(54) SAFETY INTERLOCK SYSTEM FOR LEFT FOOT OPERATED ACCELERATOR CONTROL DEVICES

(76) Inventor: John Livingston Kazanchy, Penrose, CO (US)

( * ) Notice: Subject to any disclaimer, the term of this patent is extended or adjusted under 35 U.S.C. 154(b) by 283 days.

This patent is subject to a terminal disclaimer.

(21) Appl. No.: 12/237,271

(22) Filed: Sep. 24, 2008

(65) Prior Publication Data

US 2009/0084222 A1 Apr. 2, 2009

Related U.S. Application Data

(60) Provisional application No. 60/995,459, filed on Sep. 27, 2007.

(51) Int. Cl.
*B60R 25/00* (2006.01)

(52) U.S. Cl. ............................ 180/287; 74/529; 70/472

(58) Field of Classification Search .................. 180/287, 180/271, 335, 332; 70/472, 218, 222, 188, 70/189, 422; 74/523, 524, 529, 491, 504, 74/539, 562.5, 560, 512, 513
See application file for complete search history.

(56) References Cited

U.S. PATENT DOCUMENTS

| | | | | |
|---|---|---|---|---|
| 1,420,290 | A | 6/1922 | Schofield | |
| 2,524,486 | A | 10/1950 | Snow | |
| 2,645,948 | A | 7/1953 | Beckman | |
| 2,658,411 | A | 11/1953 | Eversman | |
| 2,829,539 | A | 4/1958 | Wilcox | |
| 3,224,294 | A | 12/1965 | Gresham | |
| 4,587,865 | A | 5/1986 | Winner | |
| 4,811,580 | A * | 3/1989 | Jang | 70/218 |
| 5,065,848 | A * | 11/1991 | Barrett | 477/199 |
| 5,085,061 | A * | 2/1992 | Maudsley | 70/225 |
| 5,168,771 | A | 12/1992 | Fujimori | |
| 5,487,317 | A | 1/1996 | Richhart | |
| 5,539,377 | A * | 7/1996 | Dillon | 340/426.11 |
| 5,586,457 | A * | 12/1996 | Keener | 70/201 |
| 5,673,575 | A * | 10/1997 | Carlo et al. | 70/209 |
| 5,839,304 | A * | 11/1998 | Wills | 70/175 |
| 5,842,364 | A * | 12/1998 | Oliver | 70/202 |
| 6,390,222 | B1 * | 5/2002 | Cornelius | 180/287 |
| 6,499,324 | B2 * | 12/2002 | Reeb et al. | 70/201 |
| 6,749,535 | B2 * | 6/2004 | Spinnato | 477/209 |
| 6,758,071 | B1 * | 7/2004 | Reeb et al. | 70/201 |
| 2007/0068325 | A1 * | 3/2007 | Rudelic et al. | 74/523 |
| 2007/0256879 | A1 * | 11/2007 | Pieronczyk et al. | 180/287 |
| 2008/0178645 | A1 * | 7/2008 | Howe et al. | 70/201 |
| 2009/0084222 | A1 * | 4/2009 | Kazanchy | 74/539 |
| 2009/0229325 | A1 * | 9/2009 | Cymbal et al. | 70/189 |

FOREIGN PATENT DOCUMENTS

| | | |
|---|---|---|
| JP | 58039529 | 3/1983 |

* cited by examiner

*Primary Examiner* — Paul N Dickson
*Assistant Examiner* — Drew Brown
(74) *Attorney, Agent, or Firm* — Glenn H. Lenzen; Husch Blackwell LLP

(57) ABSTRACT

A safety interlock system for left foot operated vehicle accelerator control systems is disclosed which permits a left foot operated accelerator control system to be immobilized so that it cannot be activated unintentionally or accidentally by an individual operator who is not familiar with a vehicle so equipped. The safety interlock system may be selectively activated by the vehicle operator manually directly by mechanical means or remotely by means of a switch-controlled hydraulic, pneumatic or electrical activator. An indicator system is provided which indicates the status of the safety interlock system to the vehicle operator.

20 Claims, 4 Drawing Sheets

SAFETY INTERLOCK SYSTEM FOR LEFT FOOT OPERATED ACCELERATOR CONTROL DEVICES

CROSS REFERENCE TO RELATED APPLICATIONS

This application claims priority to U.S. Provisional Patent Application No. 60/995,459, filed Sep. 27, 2007, which is incorporated herein by reference in its entirety as if fully set forth herein.

FIELD OF THE INVENTION

The present invention relates generally to left foot operated vehicle accelerator control devices. More specifically, the present invention relates to safety interlock systems for left foot operated vehicle accelerator control devices which are designed to prevent unintentional activation of a left foot controlled accelerator by an individual who is not familiar a vehicle so equipped.

BACKGROUND

Various control systems have been installed on right foot pedal-equipped and controlled motor vehicles which permit operation thereof by disabled individuals who have lost the use of their right foot or leg. Typically, such control systems employ pedal-actuated pivoting elements which are mounted beneath the steering column on the floor of the vehicle and which are readily accessible for left foot operation by a disabled driver. Examples of such systems are disclosed in U.S. Pat. No. 2,658,411 issued to Eversman, Nov. 10, 1953; U.S. Pat. No. 3,224,294 issued to Gresham, Dec. 21, 1965; and U.S. Pat. No. 5,168,771 issued to Fujimori, Dec. 8, 1992. These systems transmit the operator's left foot motions applied to a pedal through a series of linkages to the vehicle accelerator system.

Situations arise where a vehicle equipped with a left foot operated control system must be operated by a non-disabled individual. By way of example, vehicles in for repair and or routine servicing are operated by mechanics and garage personnel. In urban environments, often patrons at restaurants, theaters and other social events valet park their vehicles. Most commonly, if another family member requires the use of such a vehicle, he or she may not be familiar with the left foot operated control system. All of these situations result in operation of the vehicle by persons who are accustomed to right foot pedal controls and who are completely unfamiliar with the left foot control mechanism. Numerous incidents of property damage, personal injury and even death have been reported which are attributable directly to inadvertent activation of a left foot operated accelerator control by an able bodied operator, and no systems are presently available commercially which incorporate an accelerator interlock which prevents activation of the left foot operated accelerator by a non-handicapped vehicle operator.

Accordingly, a need exists for a safety interlock system for a left foot operated vehicle accelerator control device which will prevent inadvertent operation of the left foot controls by an able bodied vehicle operator.

SUMMARY OF THE INVENTION

A safety interlock system for a left foot operated accelerator control is provided which includes a locking member having first and second end portions and a generally elongate body portion disposed intermediate the end portions and being selectively movable along a longitudinal axis. An activating device is attached to one end portion for moving and positioning the locking member to be in locking engagement with an element of the accelerator control linkage mechanism.

In particular and by way of example only, according to an embodiment, a safety interlock system is provided which is manually activated by the vehicle operator by manipulation of a knob or handle affixed to one end of the locking member. A biasing member is provided to urge the locking member into locking engagement with the accelerator control apparatus unless otherwise intentionally positioned by the operator.

In another embodiment, a safety interlock system is provided which is selectively activated by means of a solenoid.

In yet another embodiment, a safety interlock system is provided which is selectively activated by means of a hydraulic actuator.

In still another embodiment, a safety interlock system is provided which is selectively activated by means of a pneumatic activator.

In another embodiment, a safety interlock system is provided which includes means for indicating to a vehicle operator the status of the safety interlock system.

Further objects, features, and advantages of the instant invention will be apparent from the following detailed description when taken in conjunction with the accompanying drawings.

DETAILED DESCRIPTION OF THE INVENTION

Before proceeding with the detailed description, it should be noted that the present teaching is by way of example and not by limitation. The concepts presented herein are not limited to use or application with one specific type of safety interlock system or left foot operated accelerator control device. Thus, although the instrumentalities described herein are for the convenience of explanation, shown and described with respect to exemplary embodiments, the principles herein may be equally applied to other types of left foot operated accelerator control system.

Figure 1:
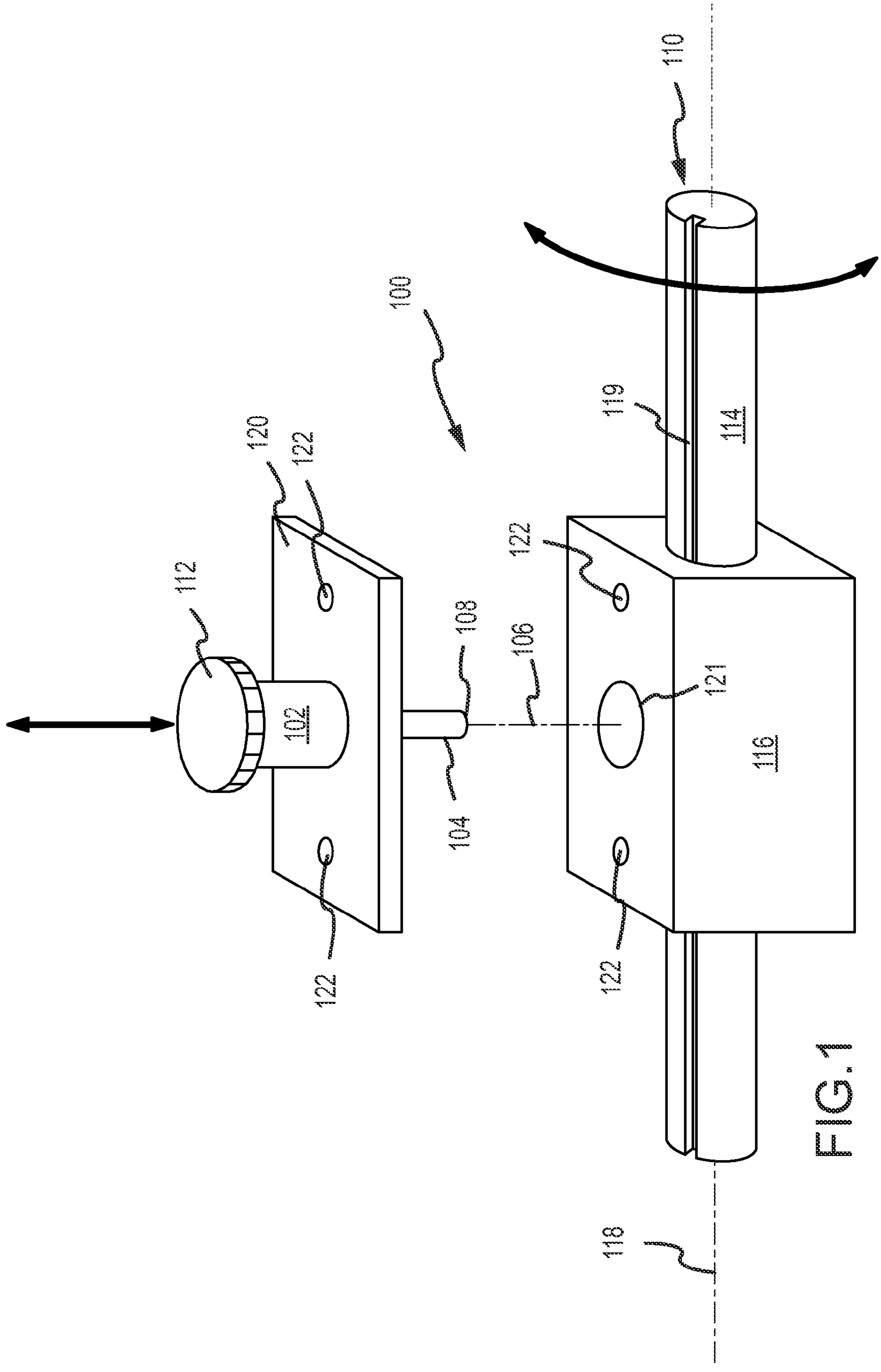
FIG. 1 is a front perspective view of a safety interlock system in accordance with an embodiment.

Referring initially to FIG. 1, a safety interlock system for a left foot operated vehicle acceleration control device or apparatus is illustrated generally at 100. The safety interlock system includes a locking member 102 having an elongate body portion 104 extending and being selectively movable along axis 106. The body portion includes a first end 108 which is adapted to be positioned locking engagement with the left foot operated acceleration control device 110, as will be described in greater detail below and a second end (not shown) to which an activating device 112 is secured for moving and positioning the locking member along the axis 106. In the embodiment shown, the activating device is in the form of a knurled knob or handle adapted to be moved between a retracted or released position in which the acceleration control device is movable and an engaged position in which the accelerator control device is immobilized. It is releasably retained in either the retracted or the engaged position by suitable securing means such as a spring-biased detent, a cam or another one of a number of suitable retaining mechanisms, as are known in the art. For safety reasons, is preferably urged into locking engagement with the acceleration control apparatus by suitable biasing means, by way of example, a compression spring (not shown). However, it is to be understood that other suitable biasing means may be employed for this purpose without departing from the scope of the present invention.

The left foot operated accelerator control device 110 includes a rotating member or shaft 114 operatively connected to a pedal (FIG. 2) for manual manipulation by a vehicle operator's left foot. The rotating member is supported by a bearing block 116 and is rotatable about axis 118 in response to the vehicle operator's left foot movements. In the embodiment shown, axis 118 is generally perpendicular to axis 106; however, it is to be understood that other angular relationships between the two axes may be configured without departing from the scope hereof. The rotational movement of shaft 114 is translated into movement of the accelerator control mechanism, as is known in the art. The shaft contains an aperture 119, which, in the embodiment shown, is in the form of a slot extending longitudinally along the length of the shaft and adapted to receive first end 108 of the locking member 102. The system may also include an indicating device, by way of example an electrical or a vacuum sensing device, to indicate to the vehicle operator the status of the safety interlock system, i.e. whether or not the locking member 102 is in locking engagement with the rotating member 114 or in the released position. The safety interlock system is secured to bearing block 116 by mounting plate 120 and suitable fastening means, by way of example, threaded fasteners, screws, bolts and the like, which extend through mounting holes 122. An aperture 121 is formed in bearing block 116 and is adapted to receive body portion 104 of locking member 102.

Figure 2:
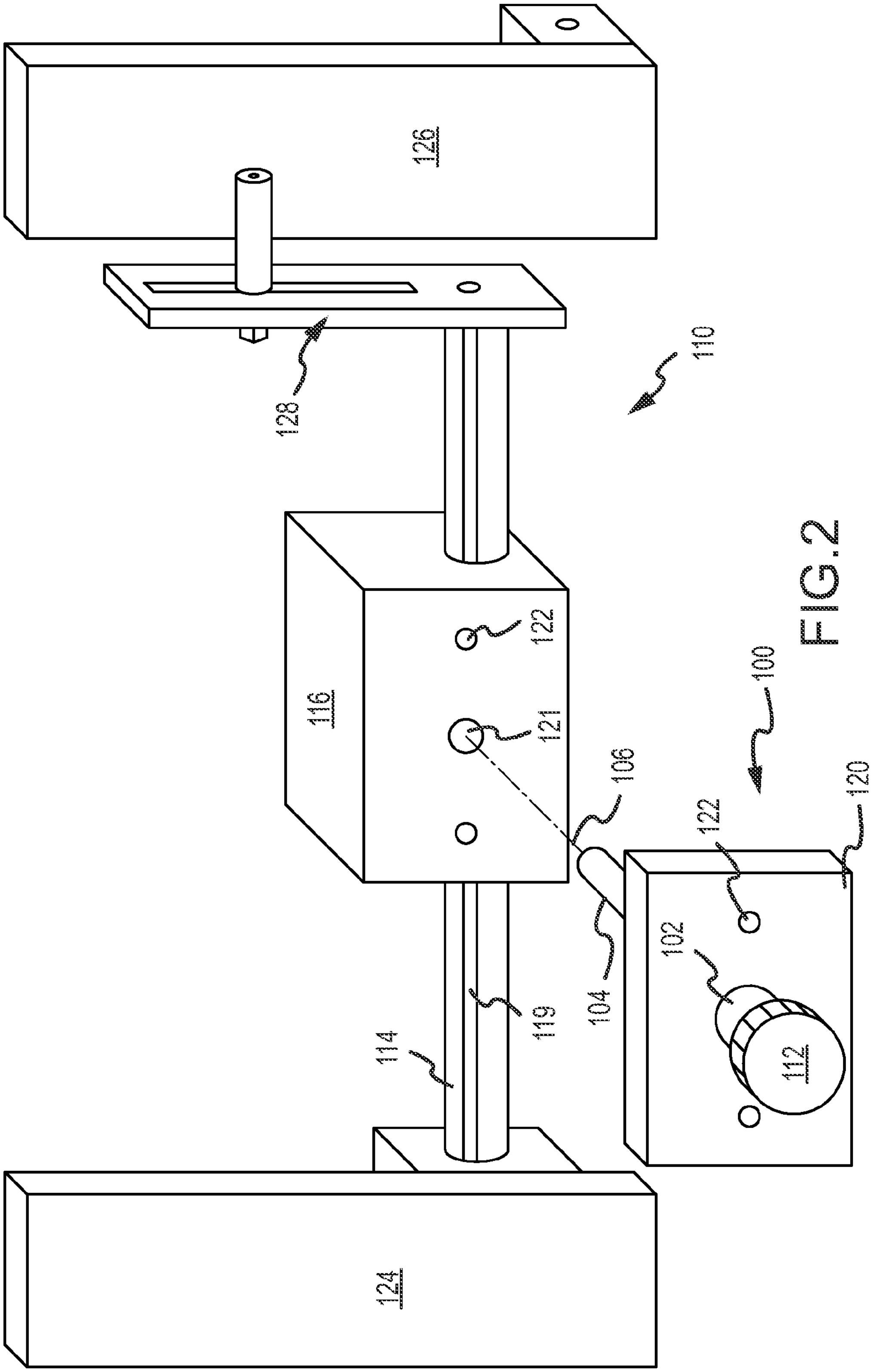
FIG. 2 is a front perspective view of a left foot operated accelerator control mechanism and a safety interlock system in accordance with an embodiment.

Referring now to FIG. 2, the safety interlock system 100 of the present invention is shown coupled to the left foot operated accelerator control apparatus 110 in greater detail. The left foot operated control device includes a pedal 124 operatively coupled to shaft 114. Pedal 114 is used by a disabled operator of the vehicle to control the vehicle acceleration and speed, which would otherwise be controlled by means of a conventional right foot pedal 126. The pedal is connected to the vehicle acceleration system by linkage 128 mounted on the shaft 114. As described above, the safety interlock system is engaged to immobilize the left foot operated accelerator control by moving the locking member 102 along axis 106 into aperture 121 until the end portion 108 is releasably engaged with aperture or slot 119. To disengage the safety interlock system, the vehicle operator simply reverses the process by manipulating the activating device 112 to extract the end portion from the aperture 119, thereby allowing free rotational movement of the shaft 114.

Figure 3:
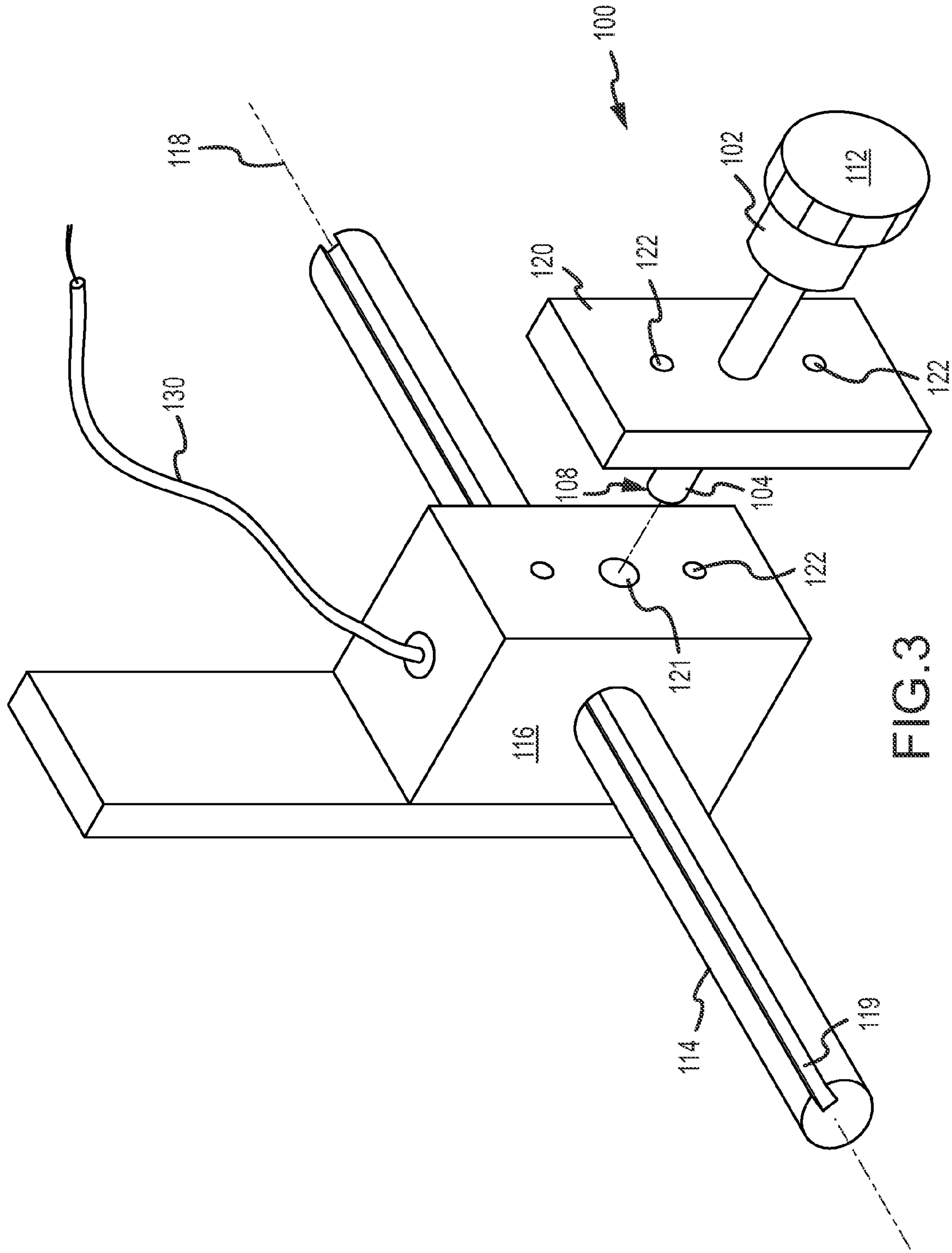
FIG. 3 is a perspective view of another left foot operated accelerator control mechanism and a safety interlock system according to an embodiment.

FIG. 3 illustrates yet another embodiment of the safety interlock system 100 of the instant invention. As hereinabove described with respect to the embodiment of FIG. 2, the safety interlock system is operatively connected to the vehicle acceleration control apparatus by connector 130. The left foot operated accelerator control mechanism may be immobilized by a vehicle operator by manipulating the activating device 112 to move the end portion 108 of body 104 of the locking member 102 into locking engagement with the aperture or slot 119 formed in the rotating member 114.

Figure 4:
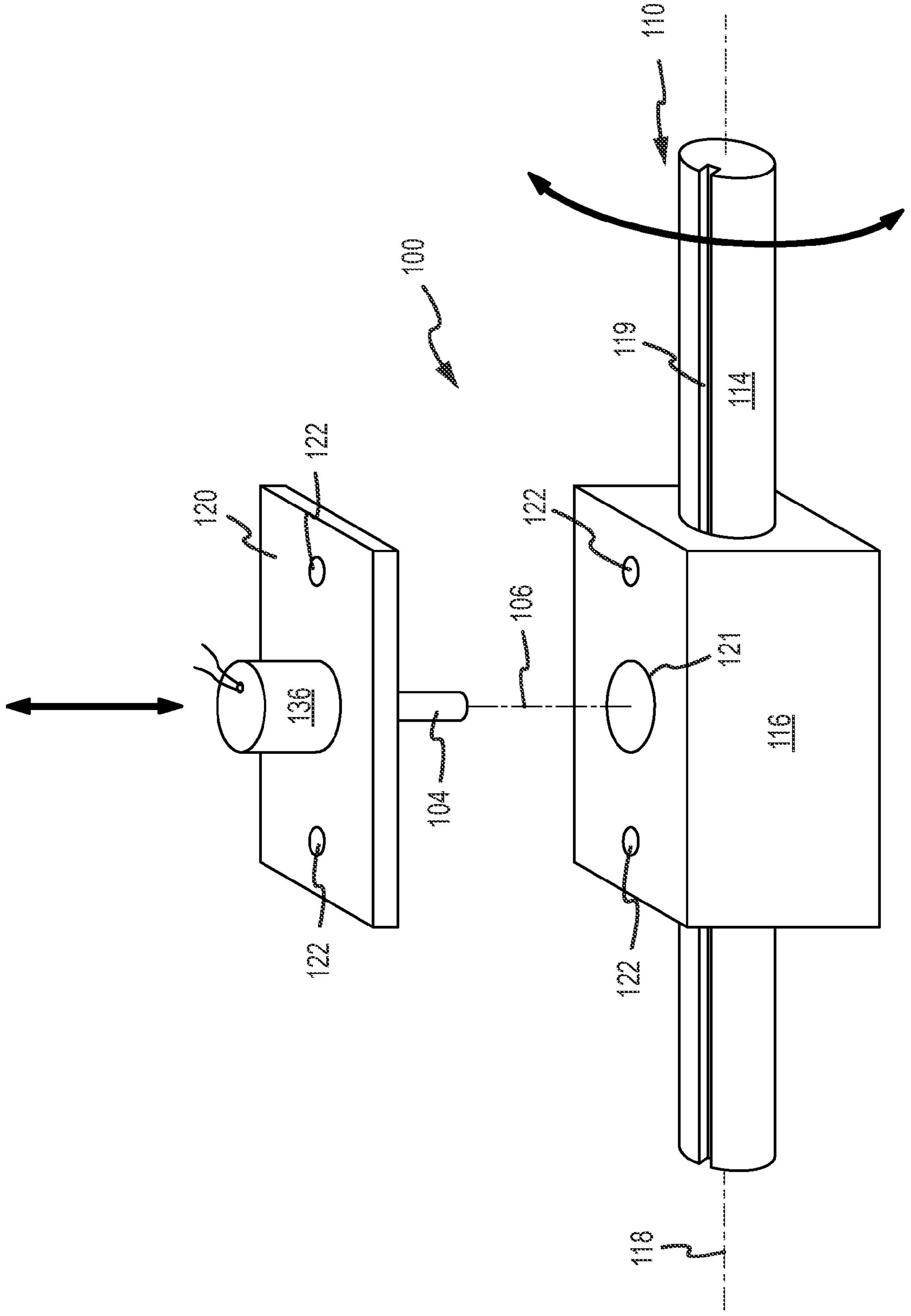
FIG. 4 is a front perspective view of yet another embodiment of the safety interlock system of FIG. 1.

In yet another embodiment of the present disclosure as shown in FIG. 4, the safety interlock system 100 includes non-manual activating devices which may be in the form of an electrical solenoid, a hydraulic activator or a pneumatic activator 136. In this embodiment, the activator is structured and arranged so as to selectively bias the body portion 104 of the locking member 102 into locking engagement with the rotating member 114, thereby preventing accidental and inadvertent activation of the left foot operated accelerator controls. To engage the left foot operated system, the vehicle operator must consciously activate the locking member 104 to the disengaged position via an activation means such as a switch, thereby freeing up the shaft 114 for rotational movement.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as statements of the scope of the present method, device and structure, which, as a matter of language, might be said to fall therebetween.

What is claimed is:

1. A safety interlock system and left foot operated vehicle acceleration control device assembly comprising:

a bearing block having a first aperture and a second aperture;

a control device including a rotating shaft and a left foot pedal operatively connected to the rotating shaft at a left end portion of the rotating shaft, the rotating shaft being rotatable about a first axis for controlling vehicle acceleration, the rotating shaft being a unitary, one-piece, integral member and extending through the first aperture of the bearing block;

a slot aperture formed in the rotating shaft;

a locking member disposed in the second aperture of the bearing block and having an elongate body portion disposed along a second axis, the locking member being selectively movable along the second axis and including a first end portion and a second end portion, the first end portion being adapted to be releasably received in locking engagement by the slot aperture, the rotating shaft being non-rotatable at the left end portion and at a right end portion of the rotating shaft when the slot aperture receives the locking member; and an activating device secured to the second end portion for moving and positioning the locking member at preselected positions along the second axis.

2. The safety interlock system of claim 1 wherein the activating device comprises a manual activator.

3. The safety interlock system of claim 2 including means for biasing the locking member into locking engagement with the rotating member.

4. The safety interlock system of claim 3 wherein the biasing means comprises a spring.

5. The safety interlock system of claim 4 further including means for indicating to an operator of the vehicle the status of the safety interlock system.

6. The safety interlock system of claim 1 wherein the activating device comprises a solenoid.

7. The safety interlock system of claim 6 wherein the solenoid is structured and arranged to urge the locking member into locking engagement with the rotating member when the vehicle ignition is in the off position.

8. The safety interlock system of claim 1 wherein the activating device comprises a hydraulic activator.

9. The safety interlock device of claim 8 wherein the hydraulic activator is structured and arranged to urge the locking member into locking engagement with the rotating member when the vehicle ignition is in the off position.

10. The safety interlock system of claim 9 including means for indicating to an operator of the vehicle the status of the safety interlock system.

11. The safety interlock device of claim 1 wherein the activating device comprises a pneumatic activator.

12. The safety interlock device of claim 11 wherein the pneumatic activator is structured and arranged to urge the locking member into locking engagement with the rotating member when the vehicle ignition is in the off position.

13. The safety interlock device of claim 12 including means for indicating to an operator of the vehicle the status of the safety interlock system.

14. In a vehicle having a left foot operated vehicle acceleration control device, the control device including a left foot pedal operatively connected to a left end portion of a rotating member, the rotating member being rotatable about a first axis for controlling vehicle acceleration, the improvement comprising:

a bearing block having a first aperture and a second aperture;

a safety interlock system including:

an aperture formed in the rotating member;

a locking member disposed in the second aperture of the bearing block and having an elongate body portion disposed along a second axis, the locking member being selectively movable along the second axis and including a first end portion and a second end portion, the first end portion being adapted to be releasably received in locking engagement by the aperture in the rotating member, the rotating member being configured and arranged as a unitary, one-piece, integral member and extending through the first aperture of the bearing block to be non-rotatable at the left end portion of the rotating member and at a right end portion of the rotating member when the aperture in the rotating member receives the locking member; and an activating device secured to the second end portion for moving and positioning the locking member at preselected positions along the second axis.

15. The vehicle of claim 14 wherein the activating device comprises a knob.

16. The vehicle of claim 14 wherein the activating device comprises a solenoid.

17. The vehicle of claim 14 wherein the activating device comprises a hydraulic activator.

18. The vehicle of claim 14 wherein the activating device comprises a pneumatic activator.

19. The vehicle of claim 14 wherein the activating device is structured and arranged to urge the locking member into locking engagement with the rotating member when the vehicle ignition is in the off position.

20. The vehicle of claim 19 including means for indicating to an operator of the vehicle the status of the safety interlock system.

* * * * *